United States Patent
Moon

(10) Patent No.: US 11,475,696 B2
(45) Date of Patent: Oct. 18, 2022

(54) DISPLAY DEVICE AND METHOD OF OPERATING THE DISPLAY DEVICE

(71) Applicant: Samsung Display Co., Ltd., Yongin-Si (KR)

(72) Inventor: Seung Hyun Moon, Hwaseong-si (KR)

(73) Assignee: Samsung Display Co., Ltd.

( * ) Notice: Subject to any disclaimer, the term of this patent is extended or adjusted under 35 U.S.C. 154(b) by 154 days.

(21) Appl. No.: 16/110,898

(22) Filed: Aug. 23, 2018

(65) Prior Publication Data
US 2019/0156095 A1    May 23, 2019

(30) Foreign Application Priority Data
Nov. 23, 2017    (KR) .......................... 10-2017-0157440

(51) Int. Cl.
| | | |
|---|---|---|
| *G06K 9/00* | (2022.01) | |
| *G09G 3/3275* | (2016.01) | |
| *G09G 3/3233* | (2016.01) | |
| *G06V 40/13* | (2022.01) | |
| *G06V 40/12* | (2022.01) | |

(52) U.S. Cl.
CPC ...... *G06V 40/1318* (2022.01); *G06V 40/1359* (2022.01); *G09G 3/3275* (2013.01); *G09G 3/3233* (2013.01); *G09G 2310/08* (2013.01); *G09G 2320/043* (2013.01); *G09G 2354/00* (2013.01); *G09G 2360/145* (2013.01)

(58) Field of Classification Search
CPC .. G06K 9/0004; G06K 9/0008; G09G 3/3275; G09G 3/3233; G09G 2310/08; G09G 2320/043; G09G 2354/00; G09G 2360/145
USPC ............................................................ 382/125
See application file for complete search history.

(56) References Cited

U.S. PATENT DOCUMENTS

| | | | |
|---|---|---|---|
| 9,570,002 B2 | 2/2017 | Sakariya et al. | |
| 2002/0190229 A1* | 12/2002 | Nakamura | H04N 5/235 250/556 |
| 2003/0147550 A1* | 8/2003 | Shigeta | G06K 9/2027 382/124 |
| 2006/0215887 A1* | 9/2006 | Nishimura | G06K 9/0012 382/124 |

(Continued)

FOREIGN PATENT DOCUMENTS

| | | |
|---|---|---|
| JP | 2006-030317 A | 2/2006 |
| KR | 10-2012-0027975 A | 3/2012 |

(Continued)

*Primary Examiner* — Charles N Appiah
*Assistant Examiner* — Nicole M Louis-Fils
(74) *Attorney, Agent, or Firm* — Innovation Counsel LLP

(57) ABSTRACT

A display device may include a display unit, a finger print sensing unit, and a timing control unit. The display unit includes a plurality of pixel units and includes a fingerprint recognition unit, which may generate first fingerprint data related to a fingerprint. The fingerprint sensing unit may extract a plurality of maxima corresponding to ridge portions of the fingerprint from the first fingerprint data to generate second fingerprint data and may generate luminance data based on the second fingerprint data. The timing control unit may calculate a degree of deterioration of the fingerprint recognition unit based on the luminance data to generate compensation data. The fingerprint recognition unit may receive a data signal corresponding to the compensation data.

19 Claims, 14 Drawing Sheets

(56) References Cited

U.S. PATENT DOCUMENTS

| | | | | |
|---|---|---|---|---|
| 2012/0106808 A1* | 5/2012 | Morioka | .............. | G06K 9/0008 |
| | | | | 382/125 |
| 2012/0263355 A1* | 10/2012 | Monden | ............. | G06V 40/1388 |
| | | | | 382/124 |
| 2013/0051638 A1* | 2/2013 | Monden | ............... | A61B 5/1172 |
| | | | | 382/125 |
| 2013/0301124 A1* | 11/2013 | Yamazaki | ............ | G09G 3/3233 |
| | | | | 359/464 |
| 2014/0029847 A1* | 1/2014 | Frye | ........................ | G06T 5/005 |
| | | | | 382/167 |
| 2016/0155389 A1* | 6/2016 | Beon | ..................... | G06F 3/1446 |
| | | | | 345/690 |
| 2019/0385568 A1* | 12/2019 | Song | .................... | G09G 3/3291 |
| 2020/0343477 A1* | 10/2020 | Zeng | .................. | H01L 27/3262 |
| 2021/0286968 A1* | 9/2021 | Toda | .................... | A61B 5/1171 |

FOREIGN PATENT DOCUMENTS

| | | |
|---|---|---|
| KR | 10-2015-0019506 A | 2/2015 |
| KR | 10-2017-0036192 A | 4/2017 |
| KR | 10-2017-0080889 A | 7/2017 |

* cited by examiner

DISPLAY DEVICE AND METHOD OF OPERATING THE DISPLAY DEVICE

This application claims priority to Korean Patent Application No. 10-2017-0157440 filed on Nov. 23, 2017 in the Korean Intellectual Property Office; the contents of the Korean Patent Application are incorporated herein by reference.

BACKGROUND

1. Field

The technical field relates to a display device and a method of driving the same.

2. Description of the Related Art

Modern display devices may include liquid crystal display (LCD) devices and organic light emitting display (OLED) devices.

An organic light emitting display device displays an image using an organic light emitting element generating light by recombination of electrons and holes. The organic light emitting display device may have a high response speed, high luminance, a wide viewing angle, and low power consumption.

A liquid crystal display device typically includes electric field generating electrodes (such as a pixel electrode and a common electrode) and a liquid crystal layer. In the liquid crystal display device, a voltage is applied to the electric field generating electrodes to form an electric field in the liquid crystal layer, so that liquid crystal molecules in the liquid crystal layer are oriented to control transmission of incident light for displaying an image.

SUMMARY

An embodiment is related to a display device. The display device can measure the degree of deterioration of a fingerprint recognition unit and can compensate for the deterioration of the fingerprint recognition unit. An embodiment is related to a method of operating the display device.

An embodiment may be related to a display device that includes the following elements: a display unit provided with a plurality of pixel units and including a fingerprint recognition unit for generating first fingerprint data by recognizing a user's fingerprint; a fingerprint sensing unit extracting a plurality of max points corresponding to a ridge of the fingerprint from the first fingerprint data to generate second fingerprint data and generating luminance data based on the generated second fingerprint data; and a timing control unit calculating degree of deterioration of the fingerprint recognition unit based on the luminance data to generate compensation data, wherein the fingerprint recognition unit receives a data signal corresponding to the compensation data.

An embodiment may be related to a display device that includes the following elements: a display unit including a fingerprint recognition unit for generating a first fingerprint data by recognizing a user's fingerprint based on light emitted from a plurality of pixel units; a fingerprint sensing unit extracting a plurality of max points corresponding to a ridge of the fingerprint from the first fingerprint data to generate second fingerprint data and generating luminance data based on the generated second fingerprint data; a timing control unit calculating degree of deterioration of the fingerprint recognition unit based on the luminance data to generate compensation data; and a data driving unit connected with the plurality of pixel units through a plurality of data lines, wherein the fingerprint recognition unit receives a plurality of data signals corresponding to the compensation data from the data driving unit.

An embodiment may be related to a method of operating a display device. The display device includes a fingerprint recognition unit and a plurality of pixel units. The method may include the following steps: recognizing a user's fingerprint to generate first fingerprint data; extracting a plurality of max points corresponding to a ridge of the fingerprint from the first fingerprint data to generate second fingerprint data; generating luminance data based on the generated second fingerprint data; and calculating degree of deterioration of the fingerprint recognition unit based on the luminance data to generate compensation data.

An embodiment may be related to a display device. The display device may include a display unit, a finger print sensing unit, and a timing control unit. The display unit may include a plurality of pixel units and may include a fingerprint recognition unit, which may generate first fingerprint data related to a fingerprint. The fingerprint sensing unit may extract a plurality of maxima corresponding to ridge portions of the fingerprint from the first fingerprint data to generate second fingerprint data and may generate luminance data based on the second fingerprint data. The timing control unit may calculate a degree of deterioration of the fingerprint recognition unit based on the luminance data to generate compensation data. The fingerprint recognition unit may receive a data signal corresponding to the compensation data.

The first fingerprint data include a plurality of digital values.

The plurality of digital values may correspond to a preset region in the fingerprint. The fingerprint sensing unit may select the plurality of maxima from the plurality of digital values to generate the second fingerprint data. The maxima are local maximum values of the plurality of digital values.

The display device may include a plurality of data lines and may include a data driving unit electrically connected to the plurality of pixel units through the plurality of data lines. The data driving unit may generate the data signal based on the compensation data and may provide the data signal to the fingerprint recognition unit.

The fingerprint sensing unit may include a light sensor for detecting an amount of reflected light. The reflected light may be resulted from reflection of light emitted from the plurality of pixel units.

The fingerprint sensing unit may include a light converter for converting a wavelength of the reflected light.

The fingerprint sensing unit may generate representative data based on the second fingerprint data and may convert the representative data into the luminance data.

The representative data may be an average value or greatest value of the maxima included in the second fingerprint data.

The timing control unit may compare the luminance data with a previously stored initial luminance value of the fingerprint recognition unit to generate the compensation data.

The timing control unit may compare the luminance data with a degree of deterioration of the display unit to generate the compensation data.

An embodiment may be related to a display device. The display device may include a plurality of pixel units, a fingerprint recognition unit, a fingerprint sensing unit, a timing control unit, a plurality of data lines, and a data driving unit. The fingerprint recognition unit may generate first fingerprint data related to a fingerprint based on light emitted from the plurality of pixel units. The fingerprint sensing unit may extract a plurality of maxima corresponding to ridge portions of the fingerprint from the first fingerprint data to generate second fingerprint data and for generating luminance data based on the second fingerprint data. The timing control unit may calculate a degree of deterioration of the fingerprint recognition unit based on the luminance data to generate compensation data. The data driving unit may be electrically connected to the plurality of pixel units through the plurality of data lines. The fingerprint recognition unit may receive a plurality of data signals corresponding to the compensation data from the data driving unit.

The first fingerprint data may include a plurality of digital values associated with a preset region in the fingerprint. The fingerprint sensing unit may select local maximum values among the digital values as a maximum among the maxima to generate the second fingerprint data.

The fingerprint sensing unit may include a light sensor for detecting an amount of reflected light. The reflected light may be resulted from reflection of light emitted from the plurality of pixel units.

The fingerprint sensing unit may generate representative data based on the second fingerprint data and may convert the representative data into the luminance data. The representative data may be an average value or greatest value of the maxima included in the second fingerprint data.

The timing control unit may compare the luminance data with a previously stored initial luminance value of the fingerprint recognition unit to generate the compensation data.

An embodiment may be related to a method of operating a display device. The display device may include a fingerprint recognition unit and a plurality of pixel units. The method may include the following steps: recognizing, using the fingerprint recognition unit, a fingerprint to generate first fingerprint data; extracting a plurality of maxima corresponding to ridge portions of the fingerprint from the first fingerprint data to generate second fingerprint data; generating luminance data based on the second fingerprint data; and calculating a degree of deterioration of the fingerprint recognition unit based on the luminance data to generate compensation data.

The method may include providing a data signal corresponding to the compensation data to the fingerprint recognition unit.

The step of recognizing the fingerprint may include the following steps: emitting light from the plurality of pixel units to a user's finger; and measuring an amount of the emitted light reflected by the user's finger.

The step of generating the luminance data may include the following steps: generating representative data based on the second fingerprint data; and converting the representative data into the luminance data. The representative data may be an average value or greatest value of the maxima included in the second fingerprint data.

The method may include comparing the luminance data with a previously stored initial luminance value for generating the compensation data.

DETAILED DESCRIPTION

Figure 1:
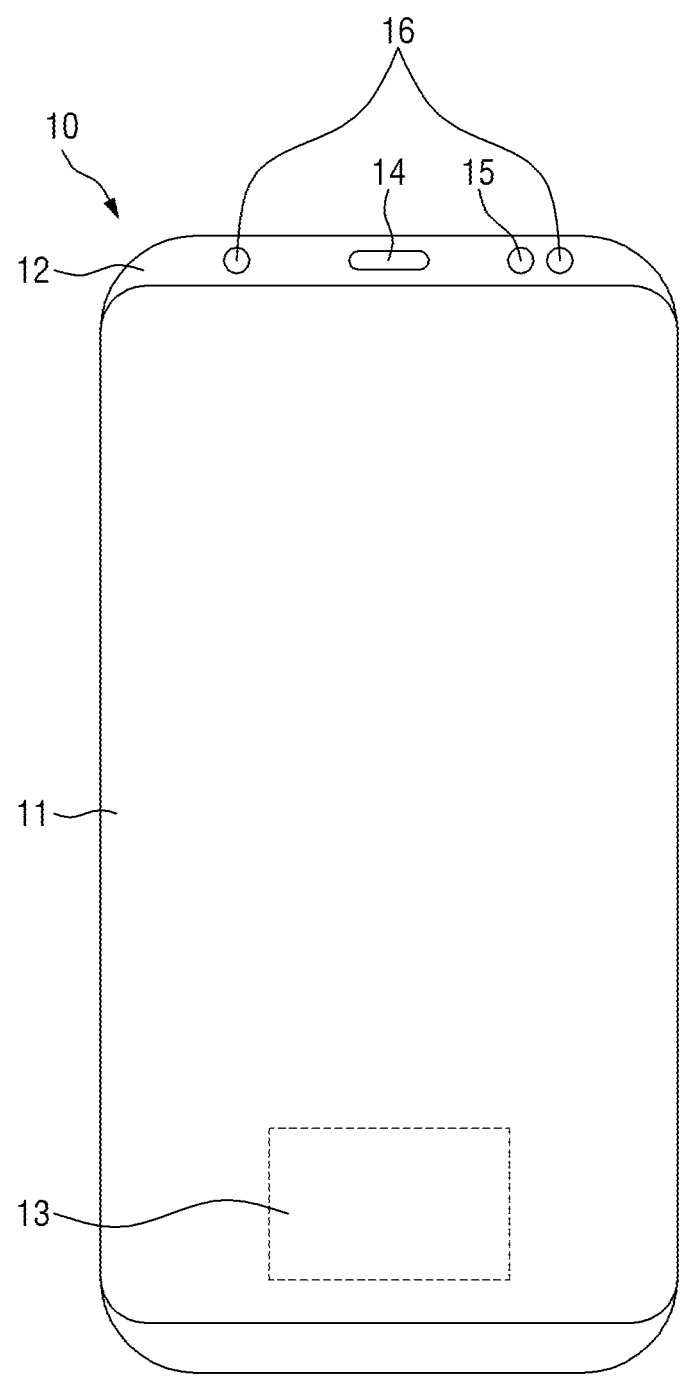
FIG. 1 is a schematic plan view of a display device according to an embodiment.

The description describes example embodiments with reference to the drawings. Various embodiments may be practiced without these specific details or with one or more equivalent arrangements.

In the accompanying figures, sizes and relative sizes of layers, films, panels, regions, etc., may be exaggerated for clarity and descriptive purposes. Like reference numerals denote like elements.

Although the terms "first," "second," etc. may be used herein to describe various elements, these elements, should not be limited by these terms. These terms may be used to distinguish one element from another element. Thus, a first element may be termed a second element without departing from teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

When a first element is referred to as being "on," "connected to," or "coupled to" a second element, the first element may be directly on, directly connected to, or directly coupled to the second element, or one or more intervening elements may be present between the first element and the second element. When a first element is referred to as being "directly on" a second element, there are no intended intervening elements (except environmental elements such as air) present between the first element and the second element. As used herein, the term "and/or" may indicate one or more of the associated items.

Spatially relative terms, such as "beneath," "below," "lower," "above," "upper," and the like, may be used to describe one element or feature's relationship to another element(s) or feature(s) as illustrated in the drawings. Spatially relative terms may encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and the spatially relative descriptors used herein interpreted accordingly.

As used herein, the singular forms, "a," "an," and "the" may include the plural forms as well, unless the context clearly indicates otherwise. The terms "comprises," "comprising," "includes," and/or "including," may specify the presence of stated elements or steps, but may not preclude the presence or addition of one or more other elements or steps.

Variations from the shapes of the illustrations as a result, for example, of manufacturing techniques and/or tolerances, are to be expected. Thus, embodiments disclosed herein should not be construed as limited to the particular illustrated shapes, but are to include deviations in shapes that result from, for instance, manufacturing.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The term "connect" may mean "electrically connect." The term "ridge" or "ridge portion" may mean "ridge-corresponding portion." The term "max" may mean "maximum." The term "max point" may mean "maximum" or "maximum value." The term "recognize" may mean "sense, record, and/or recognize." The term "connected with" may mean "connected to."

FIG. 1 is a schematic plan view of a display device according to an embodiment.

Referring to FIG. 1, a display device 10 according to an embodiment may include a display area 11 and a non-display area 12.

The display area 11 is for displaying an image. Further, the display area 11 may operate as a detection member for detecting input from an environment. In an embodiment, at least a part of the display area 11 may be a fingerprint recognition area 13 for recognizing a user's fingerprint. That is, the fingerprint recognition area 13 may display (a portion of) an image and may be used as an area for recognizing the user's fingerprint if the user needs fingerprint recognition.

In an embodiment, not only the area 13, the entire display area 11 may be used for fingerprint recognition. In this case, the user's fingerprint may be recognized even if the user touches an area of the display area 11 outside the area 13. Further, the size and shape of the fingerprint recognition area 13 are not limited to those shown in FIG. 1.

The non-display area 12 is disposed outside the display area 11 and is not for displaying different images. The non-display area 12 may be provided with a speaker module 14, a camera module 15, and a sensor module 16. In an embodiment, the sensor module 16 may include at least one of a luminance sensor, a proximity sensor, an infrared sensor, and an ultrasonic sensor. In an embodiment, the sensor module 16 may perform a function of recognizing the iris of a user. The arrangements and configurations of the speaker module 14, the camera module 15, and the sensor module 16 are not limited to those shown in FIG. 1.

In an embodiment, the display area 11 may have a flat shape. In an embodiment, at least a part of the display area 11 may be bent. In an embodiment, the display area 11 may be disposed at and/or extend to an edge of the display device 10.

Figure 2:
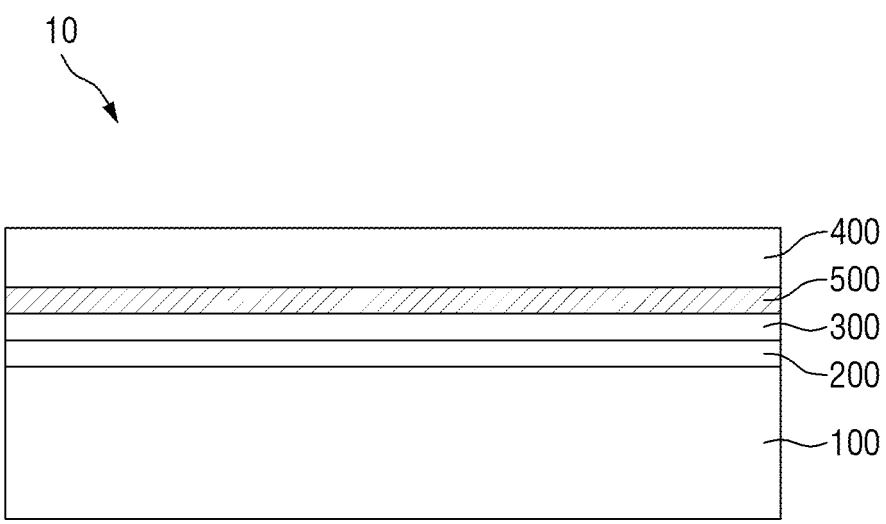
FIG. 2 is a schematic cross-sectional view of the display device shown in FIG. 1 according to an embodiment.

FIG. 2 is a schematic cross-sectional view of the display device shown in FIG. 1 according to an embodiment.

Referring to FIG. 2, the display device 10 may include a display panel 100, an input sensing layer 200, an anti-reflection layer 300, and a window panel 400. A panel may include a base layer providing a base surface. The base layer may include a synthetic resin film, a composite material film, and a glass substrate.

The display panel 100 is for displaying an image. The display panel includes a plurality of display elements. In an embodiment, the plurality of display elements may be organic light emitting elements. That is, the display panel 100 may be an organic light emitting display panel. In an embodiment, the display panel 100 may be a quantum dot display panel, a liquid crystal display panel, or the like.

In an embodiment, the input sensing layer 200 may sense a user's hand or touch pen that contacts the display device. The input sensing layer 200 may be disposed on the display panel 100. The input sensing layer 200 may be formed on the display panel 100.

The anti-reflection layer 300 may reduce the reflectance of external light. In an embodiment, the anti-reflection layer 300 may include a retarder and a polarizer. In an embodiment, the anti-reflection layer 300 may include a black matrix and a color filter. The anti-reflection layer 300 may be unnecessary in an embodiment.

The window panel 400 may protect the display panel 100 and/or the input sensing layer 200 from potential damage. The window panel 400 may be disposed on the anti-reflection layer 300. In an embodiment, the window panel 400 may be combined with the anti-reflection layer 300 through an adhesive member 500. In an embodiment, the adhesive member 500 may be a pressure sensitive adhesive (PSA) member, an optical clear adhesive (OCA) member, or an optical clear resin (OCR) film.

In an embodiment, the input sensing layer 200 may be an input sensing panel. Further, the anti-reflection layer 300 may be an anti-reflection panel. In this case, the input sensing panel and the anti-reflection panel may be combined with the display panel and the input sensing panel, respectively, through additional adhesive members.

Figure 3:
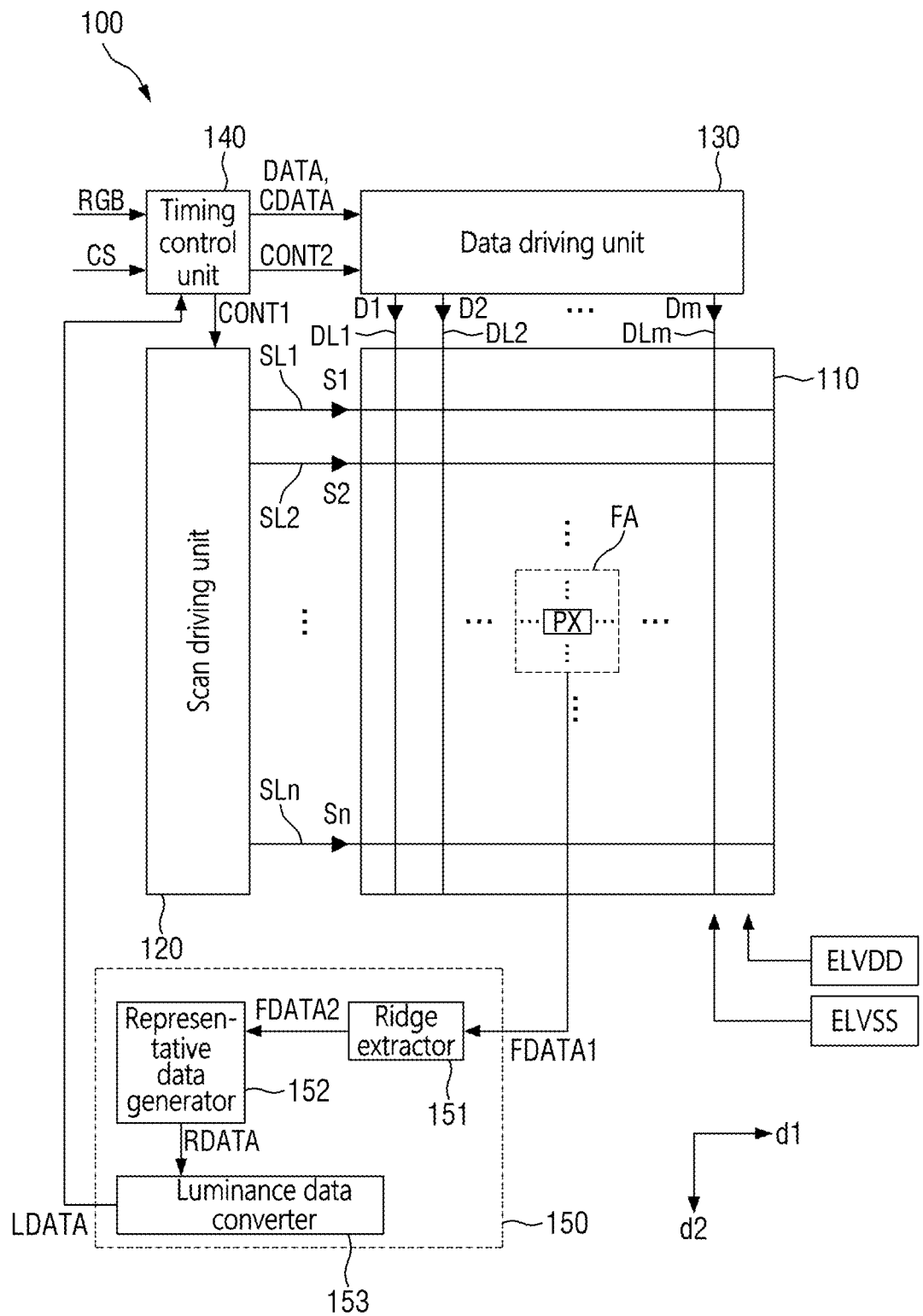
FIG. 3 is a schematic block diagram of a display panel of a display device according to an embodiment.

FIG. 3 is a schematic block diagram of the display panel 100 shown in FIG. 2 according to an embodiment.

Referring to FIG. 3, the display panel 100 may include a display unit 110, a scan driving unit 120, a data driving unit 130, a timing control unit 140, and a fingerprint sensing unit 150.

The display unit 110 may display an image. The display unit 110 may overlap (and/or may be positioned in) the display area 11 described with reference to FIG. 1. The plurality of pixel units PX is arranged in the display unit 110. The display unit 110 may be connected with scan lines SL1, SL2, ... to SLn (n is a natural number of 2 or more) extending in a first direction d1 and data lines DL1, DL2, ... to DLm (m is a natural number of 2 or more)

extending in a second direction d2 different from the first direction d1. The first direction d1 may be a row direction, and the second direction d2 may be a column direction.

Figure 4A:
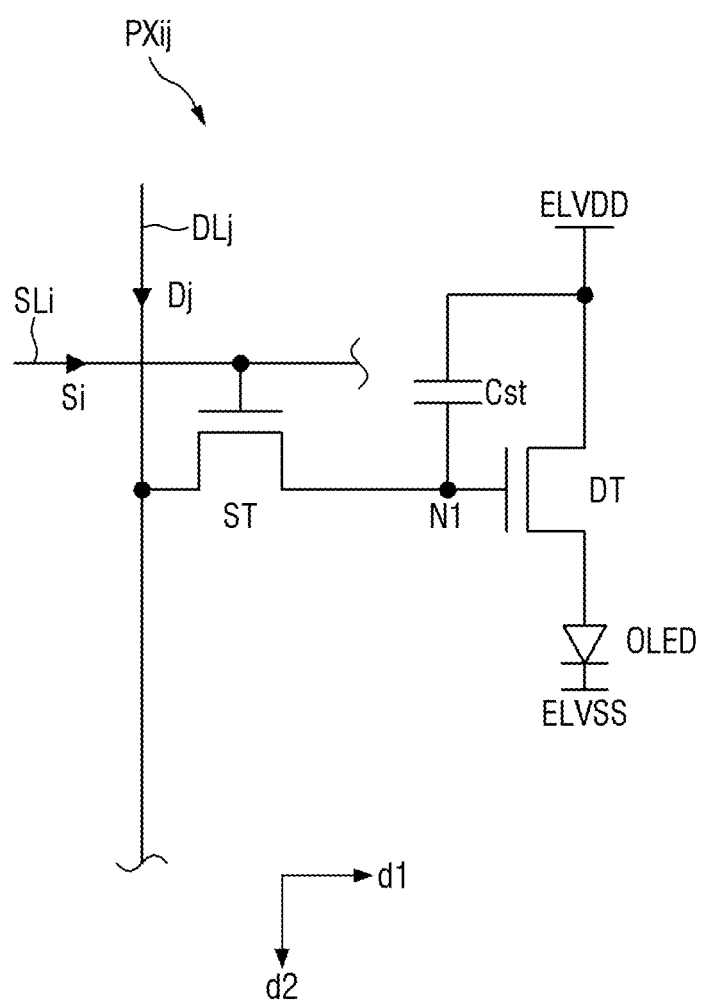
FIG. 4A is an equivalent circuit diagram of an embodiment of a pixel unit.

FIG. 4A is an equivalent circuit diagram of an embodiment of a pixel unit shown in FIG. 3. In FIG. 4A, a pixel unit PXij connected to an i-th scan line Sli (i is a natural number of 1 or more) and a j-th data line DLj (j is a natural number of 1 or more) will be described as an example.

Referring to FIG. 4A, the pixel unit PXij may include a scan transistor ST, a driving transistor DT, a storage capacitor Cst, and an organic light emitting diode OLED.

The scan transistor ST may include a source electrode electrically connected with the j-th data line DLj extending in the first direction d1, a gate electrode electrically connected with the i-th scan line SLi extending in the second direction d2, and a drain electrode electrically connected with a first node N1. The scan transistor ST may perform a switching operation based on an i-th scan signal Si received from the i-th scan line SLi to provide a j-th data signal Dj received from the j-th data line DLj to the first node N1.

The driving transistor DT may include a gate electrode electrically connected with the first node N1, a source electrode receiving a first driving voltage ELVDD, and a drain electrode connected with one electrode of the organic light emitting diode OLED. The other electrode of the organic light emitting diode OLED receives a second driving voltage ELVSS. The first driving voltage ELVDD and the second driving voltage ELVSS are direct current (DC) voltages, and the second driving voltage ELVSS has a lower voltage level than the first driving voltage ELVDD.

The driving transistor DT may perform a switching operation based on the j-th data signal Dj to control the amount of the driving current flowing to the organic light emitting diode OLED.

The storage capacitor Cst may include one electrode electrically connected with the first node and the other electrode receiving the first driving voltage ELVDD. The storage capacitor Cst may be charged with a voltage difference between the voltage provided to the first node N1 and the first driving voltage ELVDD.

The pixel unit PXij may further include a transistor in addition to the scan transistor ST and the driving transistor DT. In an embodiment, the pixel unit PXij may further include a compensation transistor for compensating for a threshold voltage of the driving transistor DT, an initialization transistor for initializing the gate electrode or the like of the driving transistor DT, or a light emission control transistor for controlling the light emission of the organic light emitting diode OLED.

Figure 4B:
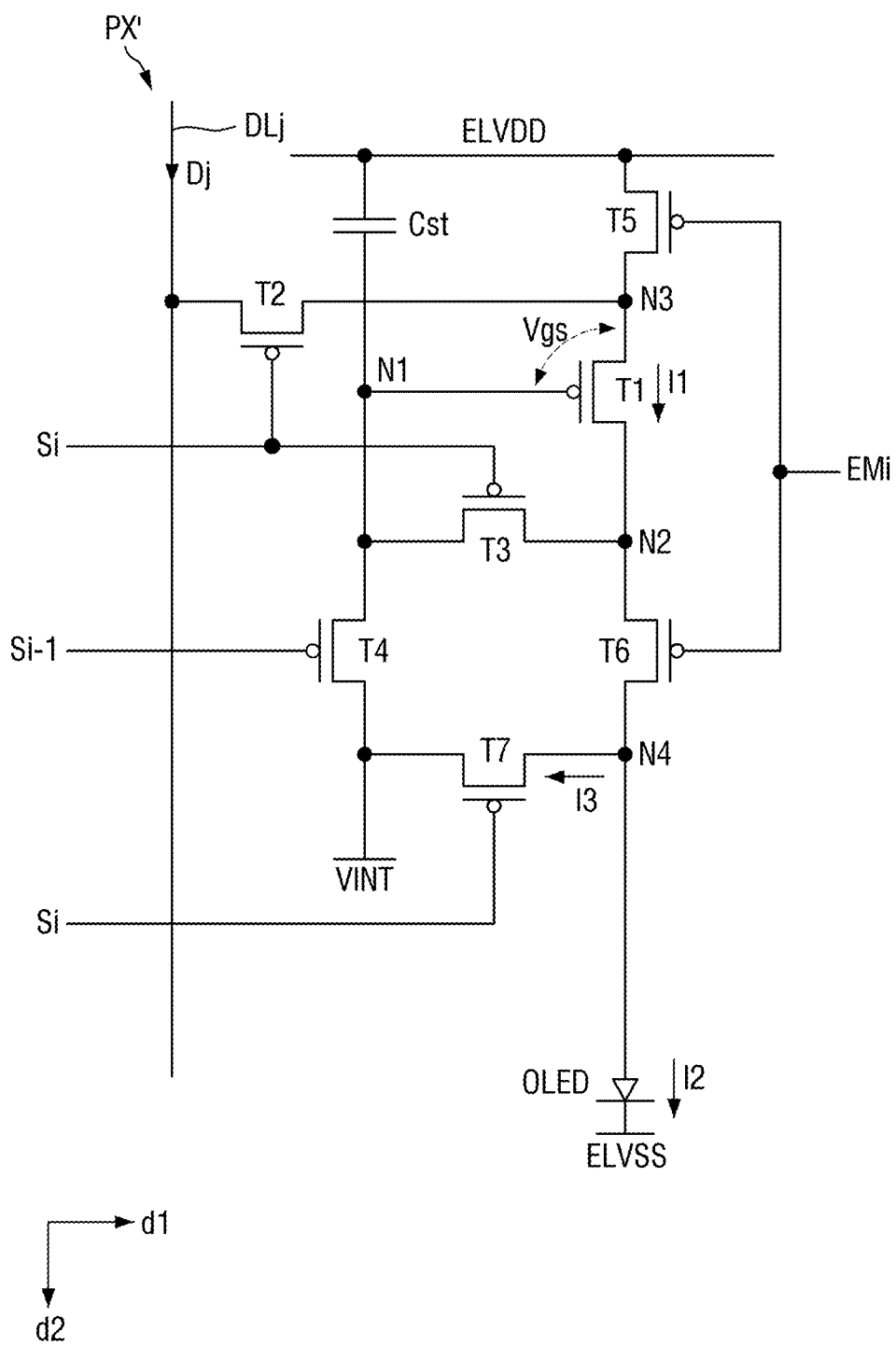
FIG. 4B is an equivalent circuit diagram of an embodiment of a pixel unit.

FIG. 4B is an equivalent circuit diagram of an embodiment of a pixel unit shown in FIG. 3. The pixel unit PX' shown in FIG. 4B is electrically connected to the driving integrated circuit 130 through the j-th data line DLj, and is electrically connected to the signal wiring unit 150 through the i−1-th scan line SLi-1 and i-th scan line Sli adjacent to each other. Further, the pixel unit PX' is electrically connected with the signal wiring unit 150 through an i-th light emission control line EMLi.

Referring to FIG. 4B, the pixel unit PX' may include first to seventh transistors T1 to T7, a storage capacitor Cst, and an organic light emitting diode OLED. In an embodiment, the first to seventh transistors T1 to T7 may be PMOS transistors. In an embodiment, the first to seventh transistors T1 to T7 may be NMOS transistors.

The first transistor T1 may include a gate electrode connected with a first node N1, a source electrode connected with a third node N3, and a drain electrode connected with a second node N2. The second transistor T2 may include a gate electrode receiving an i-th scan signal Si, a source electrode connected to a j-th data line DLj, and a drain electrode connected with the third node N3.

The second transistor T2 may perform a switching operation based on the i-th scan signal Si to provide the j-th data signal Dj to the source electrode of the first transistor T1 connected with the third node N3. The first transistor T1 may control the amount of the driving current I1 provided to the organic light emitting diode OLED, based on the j-th data signal Dj.

The first transistor T1 may control the driving current I1 provided to the organic light emitting diode OLED depending on a potential difference Vgs (hereinafter, referred to as a gate-source voltage) between the gate electrode and the source electrode. More specifically, the first transistor T1 is turned on when the gate-source voltage Vgs is greater than a threshold voltage Vth. Further, when the voltage level of the source electrode of the first transistor T1 becomes greater than the threshold voltage of the organic light emitting diode OLED, the current between the source electrode and drain electrode of the first transistor T1, that is, the driving current I1 is provided to the organic light emitting diode OLED. That is, the first transistor T1 may be a driving transistor, and may correspond to the driving transistor DT of FIG. 4. Further, the second transistor T2 may be a scan transistor, and may correspond to the scan transistor ST of FIG. 4.

The third transistor T3 may include a gate electrode receiving an i-th scan signal Si, a source electrode connected with the drain electrode of the first transistor T1, and a drain electrode of the gate electrode of the first transistor T1. The third transistor T3 may perform a switching operation based on the i-th scan signal Si to connect the source electrode and gate electrode of the first transistor T1 each other. The third transistor T3 may diode-connect the first transistor T1 through the switching operation, thereby compensating for the threshold voltage Vth of the first transistor T1. That is, the third transistor T3 may a compensation transistor.

When the first transistor T1 is diode-connected, a voltage obtained by lowering a voltage corresponding to the jth data signal Dj provided to the source electrode of the first transistor T1 by the threshold voltage Vth of the first transistor T1 may be provided to the gate electrode of the first transistor T1. The voltage obtained by lowering a voltage corresponding to the jth data signal Dj provided to the source electrode of the first transistor T1 by the threshold voltage Vth of the first transistor T1 is referred to as a voltage Vk-Vth reflecting the threshold voltage Vth.

Since the gate electrode of the first transistor T1 is connected to one electrode of the storage capacitor Cst, the voltage Vk-Vth reflecting the threshold voltage Vth is maintained by the storage capacitor Cst. Since the voltage Vk-Vth reflecting the threshold voltage Vth of the first transistor T1 is applied to the gate electrode and maintained, the driving current I1 flowing to the first transistor T1 is not influenced by the threshold voltage Vth. Thus, the deviation of the threshold voltage Vth of the first transistor T1 can be compensated, and luminance can be prevented from becoming nonuniform.

The fourth transistor T4 may include a gate electrode receiving an i−1-th scan signal Si-1, a source electrode receiving an initialization voltage VINT, and a drain electrode connected with the first node N1. The fourth transistor T4 may perform a switching operation based on the i−1-th scan signal Si-1 to provide the initialization voltage VINT to the first node N1. As described above, the first node N1 is connected with the gate electrode of the first transistor T3.

Further, the i−1-th scan signal Si-1 is a signal provided earlier than the i-th scan signal Si.

Therefore, the fourth transistor T4 may be turned on first before the second transistor T2 is turned on, thereby providing the initialization voltage VINT to the gate electrode of the first transistor T1. The voltage level of the initialization voltage VINT is not particularly limited as long as the voltage level of the gate electrode of the first transistor T1 can be sufficiently lowered. That is, the fourth transistor T4 may be an initialization transistor.

The fifth transistor T5 may include a gate electrode receiving the i-th light emission control signal EMi, a source electrode receiving the first driving voltage ELVDD, and a drain electrode connected with the third node N3. The fifth transistor T5 may perform a switching operation based on the i-th light emission control signal EMi to provide the first driving voltage ELVDD to the source electrode of the first transistor T1 connected with the third node N3.

The sixth transistor T6 may include a gate electrode receiving the i-th light emission control signal EMi, a source electrode connected with the second node N2, and a drain electrode connected with the fourth node N4. The sixth transistor T6 may perform a switching operation based on the i-th light emission control signal EMi to form a current path through which the driving current I1 flows toward the organic light emitting diode OLED. The organic light emitting diode OLED can emit light according to the light emission current corresponding to the driving current I1. That is, the fifth transistor T5 and the sixth transistor T6 may be light emission control transistors.

The seventh transistor T7 may include a gate electrode receiving the i-th scan signal Si, a source electrode receiving the initialization voltage VINT, and a drain electrode connected with the fourth node N4. When the seventh transistor T7 is turned off, a bypass current I3 may flow in a direction from the fourth node N4 to the seventh transistor T7.

Even if the minimum current of the first transistor T1 for displaying a black image flows as the driving current I1, if the organic light emitting diode OLED emits light, the black image is not properly displayed. That is, the seventh transistor T7 may disperse a part of the minimum current of the first transistor T1 into a current path other than the direction of the organic light emitting diode OLED, as the bypass current I3. Here, since the minimum current of the first transistor T1 is set such that the gate-source voltage Vgs of the first transistor T1 is lower than the threshold voltage Vth of the first transistor T1, the minimum current of the first transistor T1 means a current under a condition that the first transistor T is turned off. The black image is displayed by transferring the minimum driving current under the condition of the first transistor T1 being turned off to the organic light emitting diode OLED. When the minimum driving current for displaying the black image flows, the influence of bypass transfer of the bypass current I3 is great. In contrast, when a driving current for displaying a general image or a white image flows, there may be almost no influence of the bypass current I3. Thus, when a driving current for displaying a black image flows, the light emission current I2 of the organic light emitting diode OLED, which is reduced by the amount of the bypass current I3 exiting from the driving current I1 through the seventh transistor T7, may have the minimum current amount to such a level that the black image can be clearly expressed. Therefore, a contrast ratio can be improved by implementing an accurate black image. That is, the seventh transistor T7 may be a bypass transistor.

Referring to FIG. 3 again, some of the plurality of pixel units PX disposed on the display unit 110 may be included in a fingerprint recognition unit FA. The fingerprint recognition unit FA may overlap (and/or may be positioned in) the fingerprint recognition area 13 described above with reference to FIG. 1. The fingerprint recognition unit FA may further include a plurality of fingerprint sensors in addition to the plurality of pixel units PX. The number of pixel units PX included in the fingerprint recognition unit FA and the number of fingerprint sensors included in the fingerprint recognition unit FA may be configured according particular embodiments.

The scan driving unit 120 may be electrically connected with the plurality of pixel units PX through the first to n-th scan lines SL1 to SLn. More specifically, the scan driving unit 120 may generate scan signals S1, S2, . . . to Sn based on the first control signal CONT1 received from the timing control unit 140. The scan driving unit 120 may provide the generated first to n-th scan signals Si to Sn to the plurality of pixel units PX through the first to n-th scan lines SL1 to SLn. In an embodiment, the scan driving unit 120 may be formed of a plurality of resistors having a plurality of transistors. The scan driving unit 120 may be an integrated circuit (IC).

The data driving unit 130 may be electrically connected with the plurality of pixel units PX through the first to m-th data lines DL1 to DLm. More specifically, the data driving unit 130 may receive a second control signal CONT2 and image data DATA from the timing control unit 140. The data driving unit 130 may generate data signals D1, D2, to Dm based on the second control signal CONT2 and the image data DATA. The data driving unit 130 may provide the generated first to m-th data signals D1 to Dm to the plurality of pixel units PX through the first to m-th data lines DL1 to DLm. In an embodiment, the data driving unit 130 may be formed as an integrated circuit (IC) including a shift register, a latch, and a digital-analog converter.

The timing control unit 140 may receive an image signal RGB and a control signal CS from an external device. The image signal RGB may include a plurality of gradation data to be provided to the plurality of pixel units PX. In an embodiment, the control signal CS may include a horizontal synchronization signal, a vertical synchronization signal, and a main clock signal. The horizontal synchronization signal indicates the time taken to display one line of the display unit 110. The vertical synchronization signal indicates the time taken to display an image of one frame. The main clock signal is a signal used as a reference for generating various signals in synchronization with the scan driving unit 120 and the data driving unit 130, respectively, by the timing control unit 140.

The timing control unit 140 processes the image signal RGB and the control signal CS in accordance with the operation conditions of the display unit 110, so as to generate the image data DATA, the first control signal CONT1, and the second control signal CONT2. The timing control unit 140 may be embedded in the data driving unit 130.

The fingerprint sensing unit 150 may generate luminance data LDATA by using the difference in light quantity according to the ridge(s) and valley(s) of a user's fingerprint from first fingerprint data FDATA1 of the user recognized through the fingerprint recognition unit FA. The timing control unit 140 may receive the luminance data LDATA and determine the degree of deterioration of the fingerprint recognition unit FA. In an embodiment, the fingerprint sensing unit 150 may be formed as a separate integrated circuit. In an embodiment, the fingerprint sensing unit 150 may be included in the timing control unit 140 or the data driving unit 130.

The fingerprint sensing unit 150 may include a ridge extractor 151, a representative data generator 152, and a luminance data converter 153.

The ridge extractor 151 may generate second fingerprint data FDATA2 based on the first fingerprint data FDATA1 received from the fingerprint recognition unit FA. In an embodiment, the first fingerprint data FDATA1 may have a plurality of digital values corresponding to the sensed user's fingerprint. The fingerprint recognition unit FA may generate the first fingerprint data FDATA1. In an embodiment, the fingerprint sensing unit 150 may convert the user's fingerprint (i.e., an image) received from the fingerprint recognition unit FA into a plurality of digital values through a separate analog-digital converter ADC.

In an embodiment, the ridge extractor 151 may extract max points from the first fingerprint data FDATA1 to generate a second fingerprint data FDATA2. A max point may be a local maximum of digital values in a preset area of the fingerprint. The ridge extractor 151 may provide the second fingerprint data FDATA2 to the representative data generator 152.

The representative data generator 152 may calculate a representative value from the second fingerprint data FDATA2. The representative data generator 152 may generate representative data RDATA by calculating the representative value using the plurality of max points included in the second fingerprint FDATA2. In an embodiment, the representative value may be a selected digital value of a max point within a predefined/specific range. In an embodiment, the representative value may be an average value or greatest value of the max points. This will be described later with reference to FIG. 11. In an embodiment, the generation of the representative data RDATA may be unnecessary, and the ridge extractor 151 may directly provide the second fingerprint data FDATA2 to the luminance data converter 153.

The luminance data converter 153 may convert the received representative data RDATA (or second fingerprint data FDATA2) into luminance data LDATA. In an embodiment, the luminance data converter 153 may convert the representative data RDATA into luminance data LDATA using a previously luminance conversion graph.

The luminance data converter 153 may provide the generated luminance data LDATA to the timing control unit 140. The timing control unit 140 may previously store an initial/previous luminance value of the fingerprint recognition unit FA. The timing control unit 140 may determine the degree of deterioration of the fingerprint recognition unit FA by comparing the luminance data LDATA with the initial/previous luminance value. The timing control unit 140 may generate compensation data CDATA based on the determined deterioration degree and may provide the compensation data CDATA to the data driving unit 130. The compensation data CDATA is for compensating for the deterioration of the fingerprint recognition unit FA.

The data driving unit 130 may generate a data signal using the compensation data CDATA. The fingerprint recognition unit FA can receive the data signal from the data driving unit 130. The data signal may enable the fingerprint recognition unit FA to maintain satisfactory performance despite deterioration.

In an embodiment, the data driving unit 130 may receive the luminance data LDATA and may generate a data signal using the luminance data LDATA by. In an embodiment, the fingerprint sensing unit 150 may generate compensation data CDATA based on the luminance data LDATA and may provide the compensation data CDATA to the data driving unit 130.

Figure 5:
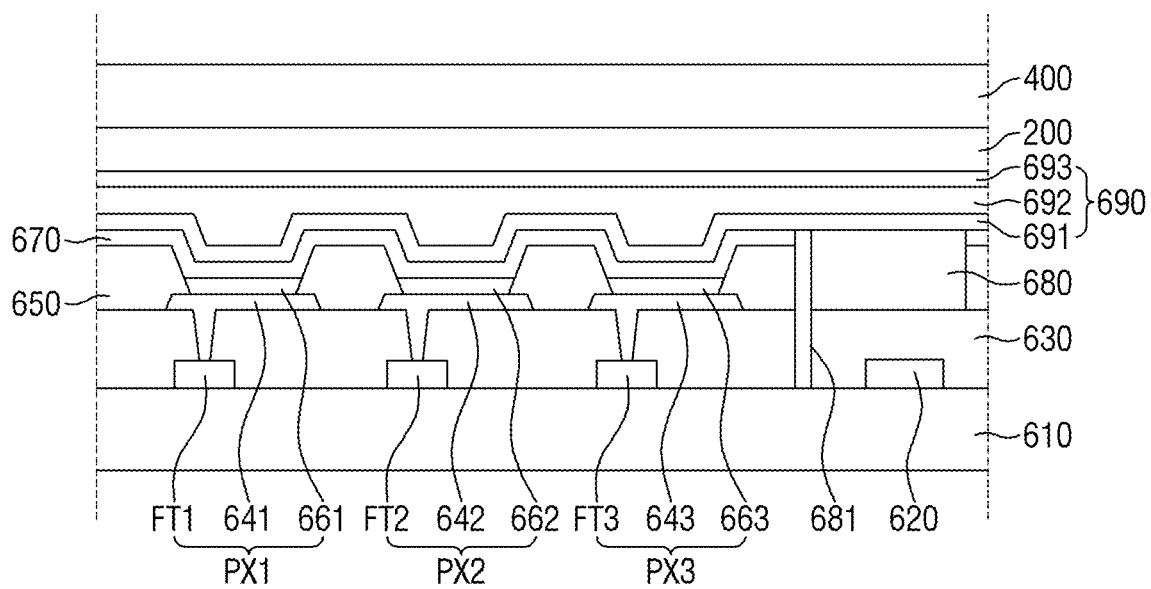
FIG. 5 is a cross-sectional view of an embodiment of a fingerprint recognition unit.

FIG. 5 is a cross-sectional view of an embodiment of the fingerprint recognition unit FA shown in FIG. 3. Although not shown in FIG. 5, the fingerprint recognition unit FA may include portions of the anti-reflection layer 300 and adhesive member 500 shown in FIG. 2.

A first substrate 610 may be an insulation substrate. In an embodiment, the first substrate 610 may include glass, quartz, or a polymer resin. In an embodiment, the first substrate 610 may be a flexible substrate including polyimide (PI).

The first substrate 610 may support first to third pixel units PX1, PX2, and PX3 for emitting light and may support a light-receiving module detecting the amount of external light. The pixel units PX1 to PX3 may emit light having different colors. The light-receiving module may include a light sensor 620 and a light converter 680. In an embodiment, the first substrate may support a buffer layer, a plurality of conductive wirings, and an insulation layer.

The first pixel unit PX1 may include a first switching element FT1, a first pixel electrode 641, and a first organic light emitting layer 661. The pixel unit PX2 may include a switching element FT2, a pixel electrode 642, and an organic light emitting layer 662. The pixel unit PX3 may include a switching element FT3, a pixel electrode 643, and an organic light emitting layer 663. The first pixel unit PX1 may further include a storage capacitor and a plurality of switching elements in addition to the first switching element, the first pixel electrode 641, and the first organic light emitting layer 661. The first switching element FT1 may represent the driving transistor DT described above with reference to FIG. 4A.

An insulation layer 630 may be disposed on the first switching element FT1. The insulation layer 630 may include a contact hole exposing one electrode of the first switching element FT1. The insulation layer 630 may be formed of at least one of inorganic insulating materials, such as silicon oxide (SiOx) and silicon nitride (SiNx). The insulation layer 630 may be formed of at least one of organic insulating materials, such as benzocyclobutene (BCB), acrylic materials, and polyimide. The insulation layer 630 may be formed of a mixture of two or more of the aforementioned materials.

The first pixel electrode 641 may be disposed on the insulation layer 630. In an embodiment, the first pixel electrode 641 may be an anode electrode. When the first pixel electrode is an anode electrode, the first pixel electrode may be a transparent electrode or a translucent electrode, or may be formed of a reflective material such as aluminum, silver, chromium, or an alloy. The transparent or translucent electrode may include one or more of ITO (Indium Tin Oxide), IZO (Indium Zinc Oxide), ZnO (Zinc Oxide), $In_2O_3$ (Indium Oxide), IGO (Indium Gallium Oxide), and AZO (Aluminum Zinc Oxide). In an embodiment, the reflective material may include one or more of silver (Ag), magnesium (Mg), chromium (Cr), gold (Au), platinum (Pt), nickel (Ni), copper (Cu), tungsten (W), and aluminum (Al).

A pixel defining film 650 may be disposed on the plurality of pixel electrodes including the first pixel electrode 641. The pixel defining film 650 may expose at least a part of the first pixel electrode 641. The pixel defining film 650 may include an organic material or an inorganic material. In an embodiment, the pixel defining film 650 may include a photoresist, a polyimide-based resin, an acrylic resin, a silicon compound, or a polyacrylic resin.

The plurality of organic light emitting layers (including the first organic light emitting layer 661) may be disposed on the plurality of pixel electrodes and the pixel defining film 650. The first organic light emitting layer 661 may be disposed on a region of the first pixel electrode 641 exposed by the pixel defining film 650.

In an embodiment, the first organic light emitting layer 661 may emit one of red light, green light, and blue light. The red light may have a wavelength in a range of about 620 nm to 750 nm, and the green light may have a wavelength in a range of about 495 nm to 570 nm. The blue light may have a wavelength in a range of about 450 nm to 495 nm.

In an embodiment, the first organic light emitting layer 661 may emit white light. When the first organic light emitting layer 661 emit white light, the first organic light emitting layer 661 may have a structure in which a red light emitting layer, a green light emitting layer, and a blue light emitting layer are laminated. The first organic light emitting layer 661 may include a separate color filter for expressing at least one of red, green and blue colors.

A common electrode 670 may be disposed on the plurality of organic light emitting layers (including the first organic light emitting layer 661) and the pixel defining film 650. In an embodiment, the common electrode 670 may overlap the plurality of organic light emitting layers and the pixel defining film 650. In an embodiment, the common electrode 670 may be a cathode electrode. The common electrode 670 may include at least one of Li, Ca, LiF/Ca, LiF/Al, Al, Ag, and Mg. The common electrode 670 may be formed of a metal thin film having a low work function. The common electrode may be a transparent or translucent electrode including at least one of ITO (Indium Tin Oxide), IZO (Indium Zinc Oxide), ZnO (Zinc Oxide), $In_2O_3$ (Indium Oxide), IGO (Indium Gallium Oxide), and AZO (Aluminum Zinc Oxide).

A sealing layer 690 may be disposed over the first substrate 610 to cover the plurality of organic light emitting layers including the first organic light emitting layer 661. The sealing layer 690 may block a plurality of organic light emitting layers from external oxygen and moisture. In an embodiment, the sealing layer may have a single layer structure of an organic layer or an inorganic layer or a multi-layer structure in which an organic layer and an inorganic layer are laminated. The sealing layer 690 may include a first inorganic layer 691, an organic layer 692, and a second inorganic layer 693.

The first inorganic layer 691 may be disposed on the common electrode 670. The first inorganic layer 691 may include at least one of silicon oxide (SiOx), silicon nitride (SiNx), and silicon oxynitride (SiONx).

The organic layer 692 may be disposed on the first inorganic layer 691. The organic layer 692 may include at least one of epoxy, acrylate, and urethane acrylate. The organic layer 692 may flatten the step caused by the pixel defining film 650.

The second inorganic layer 693 may be disposed on the organic layer 692. The second inorganic layer 693 may include at least one of silicon oxide (SiOx), silicon nitride (SiNx), and silicon oxynitride (SiONx).

In an embodiment, at least one of the first inorganic layer 691, the organic layer 692, and the second inorganic layer 693 may have a multi-layer structure.

In an embodiment, the sealing layer 690 may be a transparent insulation substrate. The transparent insulation substrate may be a glass substrate, a quartz substrate, or a transparent resin substrate. The structure may include a buffer layer disposed on, over, or under the sealing layer 690. The buffer layer may be formed of an organic material or an inorganic material. An input sensing layer 200 and a window panel 400 may be sequentially disposed on the sealing layer 690.

A light receiving module of the fingerprint recognition unit FA may include a light converter 680 and a light sensor 620. The light converter 680 may convert the wavelength of external light or light reflected from an external body such as a user's finger into a specific wavelength range. The light sensor 620 may detect the amount of light having the specific wavelength range converted by the light converter 680. In an embodiment, the light having the specific wavelength range may be infrared light having a wavelength range of about 750 nm or more. Thus, the light sensor 620 may include an infrared (IR) sensor for detecting infrared light.

In an embodiment, the light sensor 620 may overlap the light converter 680 in a direction perpendicular to the first substrate 610. The arrangement position of the light sensor 620 and the light converter 680 is configured for recognizing a user's fingerprint.

In an embodiment, the light converter 680 may include a quantum dot. The quantum dot may have a core-shell structure. The core may be a semiconductor nanocrystalline material. In an embodiment, the core of the quantum dot may include one of Group II-VI compounds, one of Group III-V compounds, one of Group IV-VI compounds, one of Group IV elements, one of Group IV compounds, or a combination of compounds. Further, a core-shell structure in which one quantum dot surrounds another quantum dot may be provided. The interface between the core and the shell may have a concentration gradient in which the concentration of the element existing in the shell decreases toward the center. When the light converter 680 includes a quantum dot, the light sensor 620 may include a sensor for detecting the light whose wavelength range is converted by the quantum dot.

The light-receiving module may further include a partition wall 681 for preventing the leakage of light generated from each pixel PX.

Light emitted from the first to third organic light emitting layers 661, 662, and 663 may be reflected by a user's finger. The light converter 680 may convert the light reflected by the user's finger into light having one or more wavelengths within a specific wavelength range. The light sensor 620 may detect the amount of the light having the wavelength(s) within the specific wavelength range converted by the light converter 680. A fingerprint corresponding to the user's finger includes ridges (or ridge-corresponding portions) and valleys (or valley-corresponding portions). The amount of light reflected from a ridge of the user's finger and the amount of light reflected from a valley of the user's finger may be different from each other. The light sensor 620 may recognize a fingerprint using a difference in amount of light.

Figure 6:
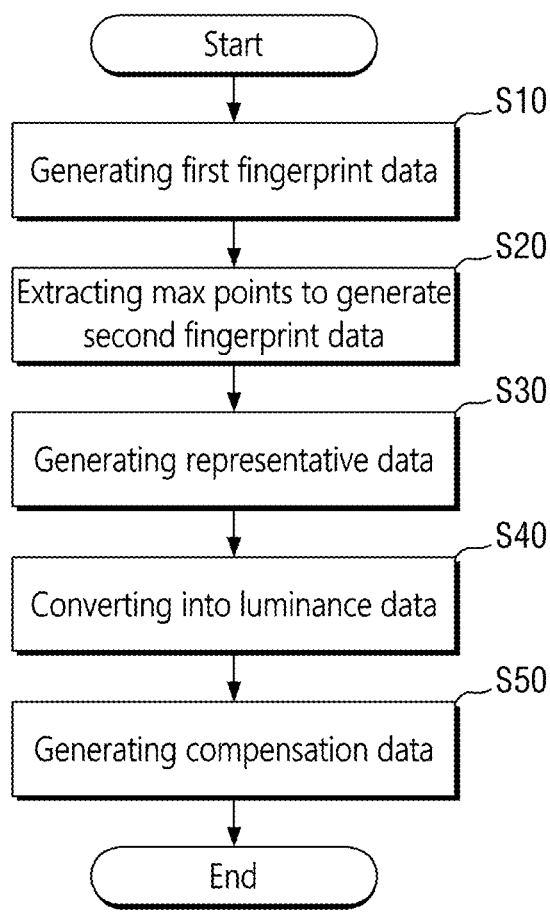
FIG. 6 is a flowchart for explaining an operating method of a display device according to an embodiment.

FIG. 6 is a flowchart for explaining a method of operating a display device, including compensating for deterioration of the display device, according to an embodiment.

Figure 7:
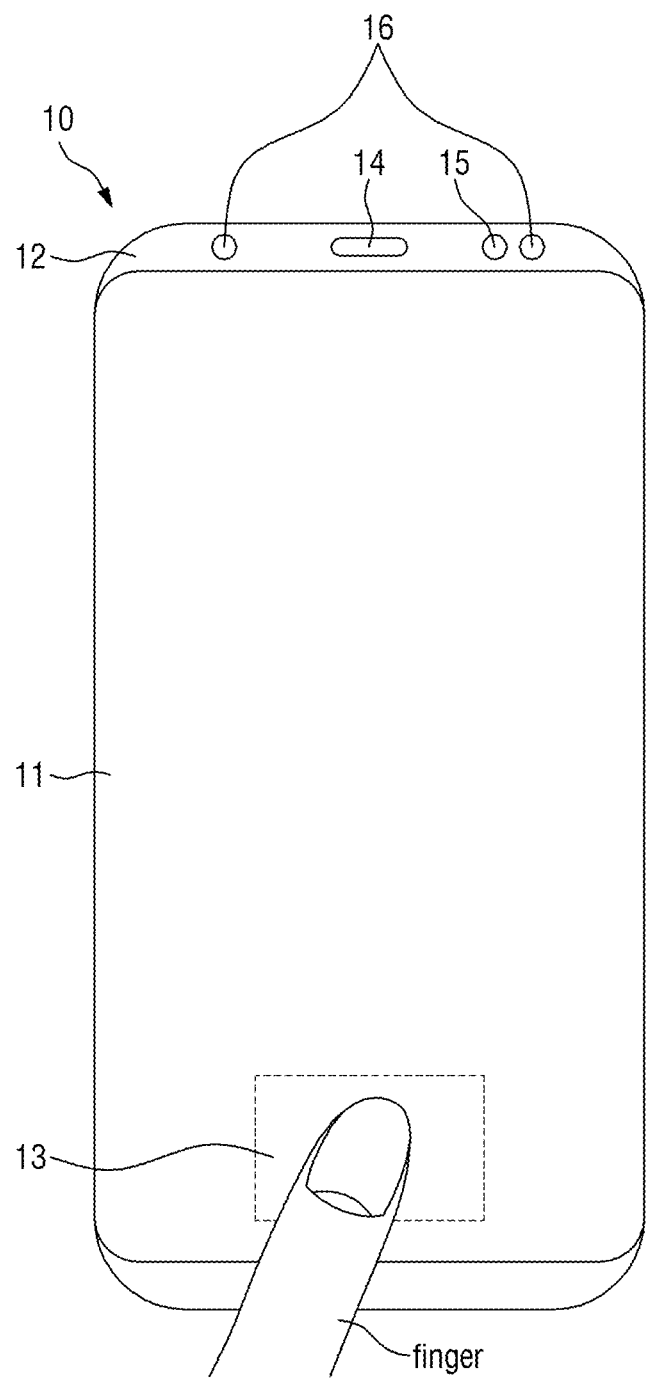
FIG. 7 is a plan view showing a state in which a user's finger touches a fingerprint recognition area of the display device shown in FIG. 1 according to an embodiment.
Figure 8A:
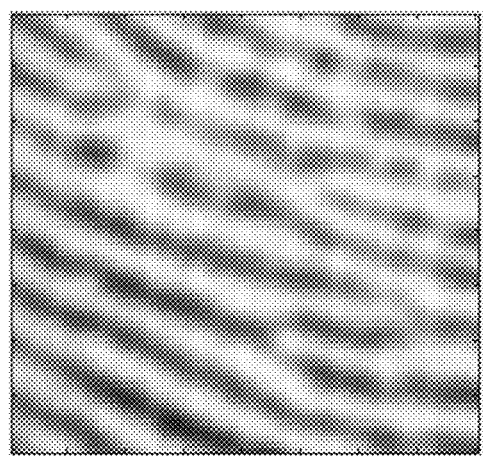
FIG. 8A is a view schematically showing (a portion of) a fingerprint of a user according to an embodiment.
Figure 8B:
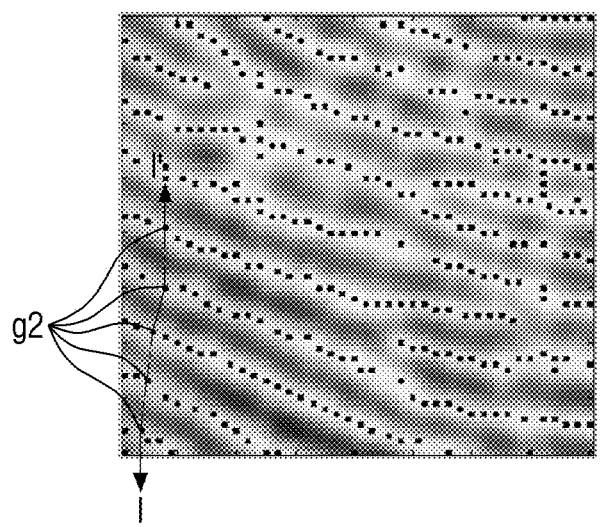
FIG. 8B is a view showing max points in the fingerprint shown in the drawing of FIG. 8A according to an embodiment.
Figure 9:
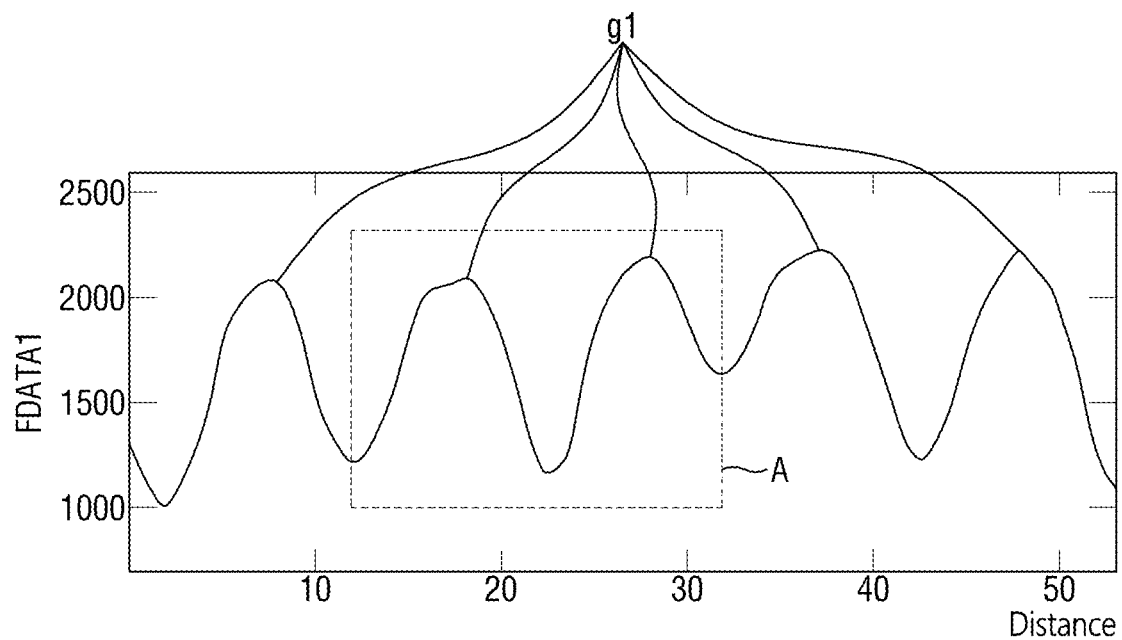
FIG. 9 is a graph showing a plurality of digital values corresponding to the line I-I' of FIG. 8B according to an embodiment.
Figure 10:
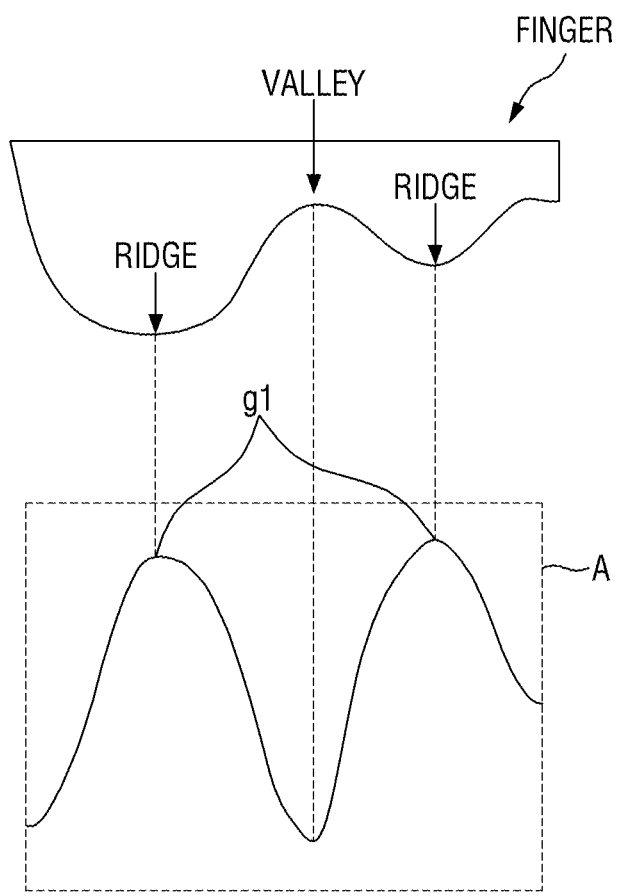
FIG. 10 is a diagram showing the area A of FIG. 9 in correspondence with a portion of the fingerprint/finger of the user according to an embodiment.

FIG. 7 is a plan view showing a state in which a user's finger touches a fingerprint recognition area of the display device shown in FIG. 1 according to an embodiment. FIG. 8A is a view schematically showing (a portion of) a fingerprint of the user. FIG. 8B is a view showing max points in the fingerprint shown in FIG. 8A according to an embodiment. FIG. 9 is a graph showing a plurality of digital values corresponding to the line I-I' of FIG. 8B according to an embodiment. FIG. 10 is a diagram showing the area A of FIG. 9 in correspondence with a portion of the fingerprint/finger of the user.

The fingerprint recognition unit FA may recognize a user's fingerprint being in contact with the fingerprint recognition area 13 to generate first fingerprint data FDATA1 (S10). The ridge extractor 151 may receive the first fingerprint data FDATA1 and extract max points to generate second fingerprint data FDATA2 (S20).

Light emitted from some or all the pixel units PX arranged in the fingerprint recognition unit FA may be reflected by the user's finger. The light converter 680 may convert the light reflected by the user's finger into light having one or more wavelengths within a predefined/specific wavelength range.

The light sensor 620 may detect the amount of the light having one or more wavelengths within the predefined/specific wavelength range converted by the light converter 680. As described above, the amount of light reflected from the ridges of the user's finger and the amount of light reflected from the valleys of the user's finger may be different from each other. Referring to FIG. 8A, the relatively bright portions correspond to ridges of the user's fingerprint, and the relatively dark portions correspond to valleys of the user's fingerprint.

The light sensor 620 may detect the amount of the light converted from the light converter 680 to generate the first fingerprint data FDATA1 having a plurality of digital values. The plurality of digital values may correspond to the ridges and valleys of the user's fingerprint.

FIG. 9 is a graph showing a plurality of digital values corresponding to the line I-I' in FIG. 8B. The horizontal axis in FIG. 9 indicates distances or locations, and the vertical axis in FIG. 9 indicates digital values. Referring to FIGS. 9 and 10, a digital value of a relatively bright portion, that is, a region corresponding to a ridge of the user's fingerprint, is relatively large. A digital value of a relatively dark portion, that is, a region corresponding to a valley of the user's fingerprint, is relatively small.

A max point is a local maximum digital value in a preset region, and max points are indicated by the reference numeral g1 in FIG. 9. Max points are indicated by the reference numeral g2 in FIG. 8B. A plurality of preset regions may be configured in the fingerprint recognition unit FA. The number of pixel units included in the preset region may be configured according to particular embodiments. Referring to FIG. 8B, a plurality of max points may correspond to the fingerprint recognition unit FA. The second fingerprint data FDATA2 includes the plurality of max points.

The ridge extractor 151 may extract the plurality of max points from the first fingerprint data FDATA1 for generating second fingerprint data FDATA2. The ridge extractor 151 may provide the generated second fingerprint data FDATA2 to the representative data generator 152.

The representative data generator 152 may generate representative data RDATA based on the second fingerprint data FDATA2 (S30). The representative data generator 152 may calculate and/or select a representative value from the plurality of max points included in the second fingerprint data FDATA2 to generate representative data RDATA. The representative value may be a value corresponding to a specific condition or range.

Figure 11:
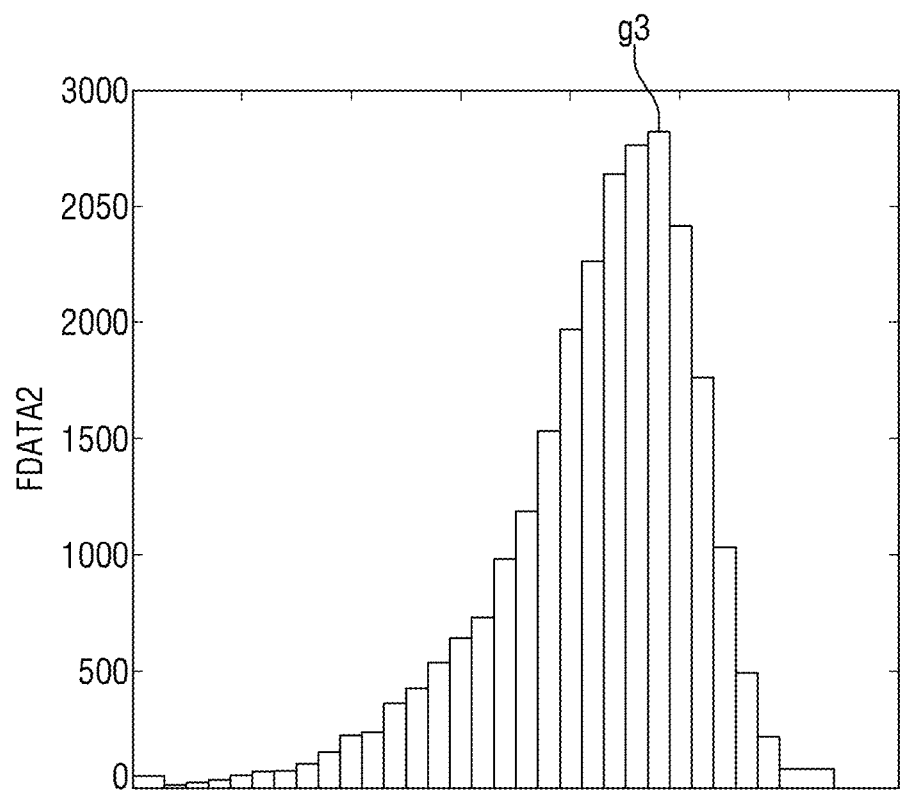
FIG. 11 is a graph showing a plurality of maxima corresponding to max points according to an embodiment.

FIG. 11 is a graph showing the distributing of a plurality of max points according to an embodiment.

Referring to FIG. 11, the max point (a digital value) indicated by the reference numeral g3 may be the greatest among the plurality of max points. Therefore, the representative data generator 152 may calculate and/or select the value of the max point indicated by g3 as a representative value to generate the representative data RDATA.

In an embodiment, the representative data generator 152 may calculate the average value of the plurality of max points included in the second fingerprint data FDATA2 as a representative value. In an embodiment, the representative data generator 152 may calculate the average value of the top 10% of the plurality of max points included in the second fingerprint data FDATA2 as a representative value. The method of determining a representative value may be configured according particular embodiments for accurately measuring the degree of deterioration of the fingerprint recognition unit FA.

Figure 12:
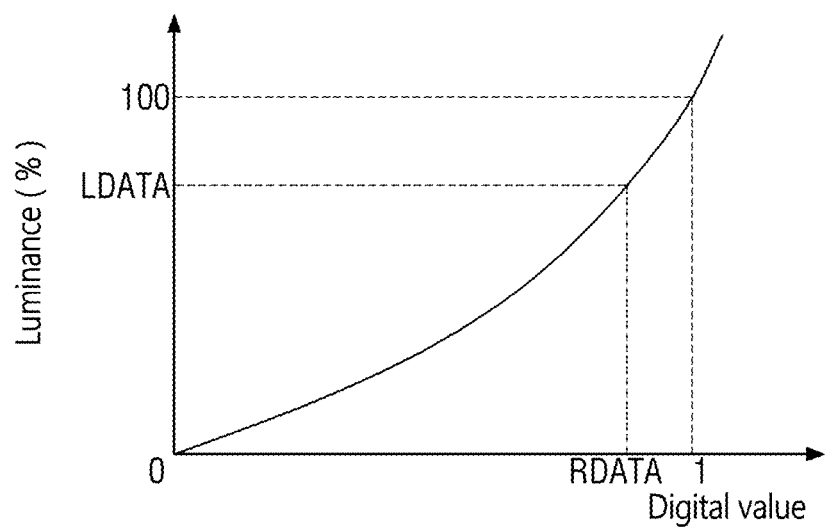
FIG. 12 is a graph for explaining a method of generating luminance data using representative data according to an embodiment.

The luminance data converter 153 may convert the representative data RDATA into luminance data LDATA. FIG. 12 is a graph for explaining a method of luminance data using representative data according to an embodiment.

The luminance data converter 153 may convert the received representative data RDATA into luminance data LDATA (S40). In an embodiment, the luminance data converter 153 may convert the representative data RDATA into the luminance data LDATA using the previously stored luminance conversion graph.

Referring to FIG. 12, the luminance conversion graph represents a luminance value corresponding to a digital value. Here, the luminance 100% means a luminance value required by the fingerprint recognition unit FA. The luminance 100% may correspond to a value al according to the graph. As an example, the digital value of the max point included in the representative data RDATA corresponds to a luminance 80%, which is lower than 100% and indicates deterioration of the fingerprint recognition unit FA. The luminance data converter 153 may calculate a luminance value corresponding to the digital value of the max point included in the representative data RDATA to generate luminance data LDATA. The luminance data converter 153 may provide the luminance data LDATA to the timing control unit 140.

The timing control unit 140 may generate compensation data CDATA based on the luminance data LDATA (S50). The timing control unit 140 may store an initial/previous luminance value of the fingerprint recognition unit FA in advance. The timing control unit 140 may determine the degree of deterioration of the fingerprint recognition unit FA by comparing the luminance data LDATA with the initial luminance value. In an embodiment, the degree of deterioration of the fingerprint recognition unit FA may be calculated by dividing the initial luminance value by the luminance data LDATA or vice versa.

The timing control unit 140 may generate compensation data CDATA based on the calculated deterioration degree and provide the compensation data CDATA to the data driving unit 130. The compensation data CDATA is for compensating for the deterioration of the fingerprint recognition unit FA.

The data driving unit 130 may generate a data signal using the compensation data CDATA. The fingerprint recognition unit FA can receive the data signal from the data driving unit 130. The data signal may enable the fingerprint recognition unit FA to maintain satisfactory performance despite deterioration.

The display device 10 according to an embodiment can prevent the deterioration of performance of the fingerprint recognition unit FA by calculating the degree of deterioration of the fingerprint recognition unit FA using data related to ridges of the user's fingerprint and compensating for the degree of deterioration of the fingerprint recognition unit FA.

In an embodiment, the timing control unit 140 may generate compensation data CDATA by measuring the degree of deterioration of the entire display unit 110 and comparing the results with the luminance data LDATA received from the fingerprint sensing unit 150.

The method of measuring the degree of deterioration of the display unit 110 may be configured according to particular embodiments.

In an embodiment, the degree of deterioration of the display unit 110 may be measured by a separate sensing transistor described with reference to FIG. 13.

Figure 13:
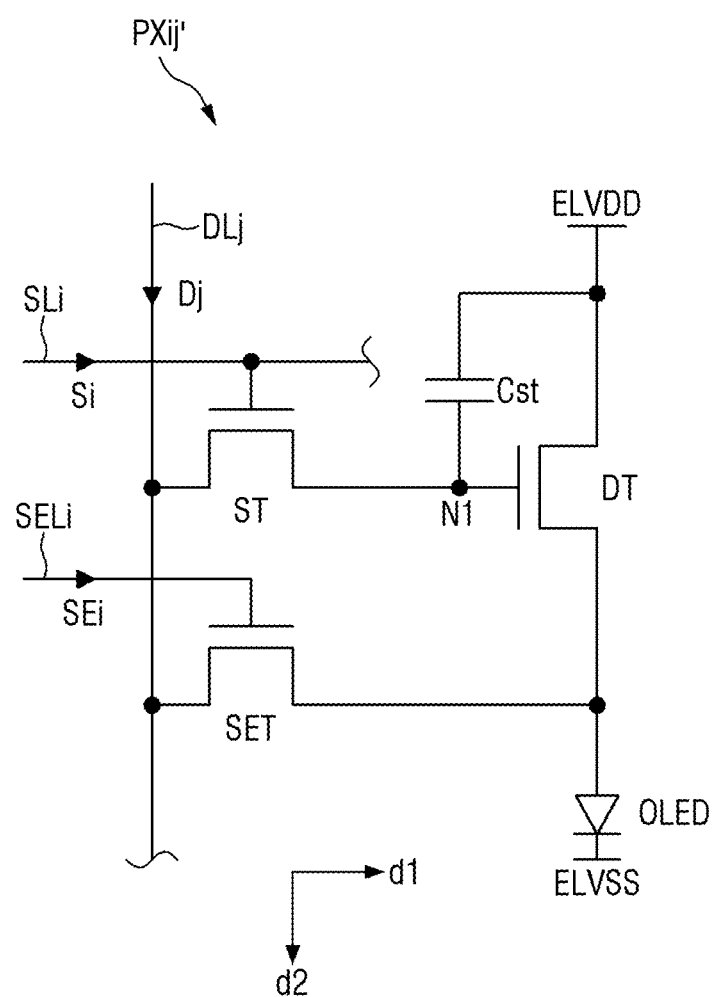
FIG. 13 is an equivalent circuit diagram of an embodiment of a pixel unit.

FIG. 13 is an equivalent circuit diagram of an embodiment of a pixel unit shown in FIG. 3.

The pixel unit PXij' may include a sensing transistor SET. The sensing transistor SET may perform a switching operation based on an i-th sensing signal SEi received from an i-th sensing line SELi to measure a driving current of the driving transistor DT, and may provide the measured driving current to the data driving unit 130. The display panel 100 may further include a separate sensing unit formed as a driving integrated circuit.

The timing control unit 140 may measure the degree of deterioration of the display unit 110 through a separate sensing transistor SET. The timing control unit 140 may generate compensation data CDATA by comparing the measured amount of deterioration of the display unit 110 with the luminance data LDATA.

In an embodiment, the degree of deterioration of the display unit 110 may be predicted using a predictive compensation method. The timing control unit 140 may generate compensation data CDATA by predicting the relative deterioration degree of the entire display unit 100 and converting the relative deterioration degree into an absolute deterioration degree based on the luminance data LDATA.

The timing control unit 140 may predict a degree of deterioration of the display unit 110 in advance and set a value corresponding to the relative deterioration degree. The timing control unit 140 may convert a value corresponding to the relative deterioration degree into an absolute value based on the luminance data LDATA and generate compensation data CDATA based on this absolute value. The compensation data may be provided to the entire display unit 110 as well as the fingerprint recognition unit FA.

In an embodiment, the timing control unit 140 may previously store data associated with a relation between the degree of deterioration of the display unit 110 and the degree of deterioration of the fingerprint recognition unit FA. The degree of deterioration of the entire display unit 110 can be predicted using the luminance data LDATA obtained by calculating the degree of deterioration of the fingerprint recognition unit FA and the comparison data.

In an embodiment, fingerprint recognition may be performed in the entire display unit 110. In this case, the luminance data of the display unit 110 may be calculated using one or more embodiments of the method described above, and the deterioration of the display unit 110 may be compensated based on the calculated luminance data.

According to embodiments, the degree of deterioration of a fingerprint recognition unit that recognizes a user's fingerprint using light emitted from a plurality of pixels can be measured and compensated. Advantageously, satisfactory performance of the fingerprint recognition unit may be substantially maintained.

Although example embodiments have been disclosed for illustrative purposes, various modifications, additions, and substitutions are within the scope defined by the accompanying claims.

What is claimed is:

1. A display device, comprising:
a display unit comprising a plurality of pixel units and comprising a fingerprint recognition unit for generating first fingerprint data related to a fingerprint using converted light;
a fingerprint sensing unit for generating second fingerprint data including a plurality of maxima corresponding to ridge portions of the fingerprint from the first fingerprint data, for generating representative data based on the plurality of maxima of the second fingerprint data, and for converting the representative data to luminance data of each of the pixel units, wherein the fingerprint sensing unit includes a light converter for converting reflected light into the converted light having one or more wavelengths within a predefined wavelength range, and wherein the light converter overlaps an organic light emitting layer of the plurality of pixel units in a lateral direction; and
a timing control unit for calculating a degree of deterioration of the fingerprint recognition unit to generate compensation data using the luminance data of each of the pixel units,
wherein the fingerprint recognition unit is configured to receive a data signal generated based on the compensation data.

2. The display device of claim 1,
wherein the first fingerprint data includes a plurality of digital values.

3. The display device of claim 2,
wherein the plurality of digital values corresponds to a preset region in the fingerprint,
the fingerprint sensing unit selects the plurality of maxima from the plurality of digital values to generate the second fingerprint data, and
the maxima are local maximum values of the plurality of digital values.

4. The display device of claim 1, further comprising:
a plurality of data lines; and
a data driving unit electrically connected to the plurality of pixel units through the plurality of data lines,
wherein the data driving unit generates the data signal based on the compensation data and provides the data signal to the fingerprint recognition unit.

5. The display device of claim 1,
wherein the fingerprint sensing unit includes a light sensor for detecting an amount of the converted light, and
the reflected light is resulted from reflection of light emitted from the plurality of pixel units.

6. The display device of claim 5, further comprising a partition wall that separates the plurality of pixel units from at least one of the light sensor and the
light converter and prevents leakage of the light emitted from the plurality of pixel units.

7. The display device of claim 1,
wherein the representative data is an average value or greatest value of the maxima included in the second fingerprint data.

8. The display device of claim 1,
wherein the timing control unit compares the luminance data with a degree of deterioration of the display unit to generate the compensation data.

9. The display device of claim 1, wherein the timing control unit calculates the degree of deterioration of the fingerprint recognition unit to generate the compensation data by dividing a previously stored initial luminance value of each of the pixel units by the luminance data of each of the pixel units.

10. A display device, comprising:
a plurality of pixel units;
a fingerprint recognition unit for generating first fingerprint data related to a fingerprint based on converted light associated with reflected light of light emitted from the plurality of pixel units;
a fingerprint sensing unit for generating second fingerprint data including a plurality of maxima corresponding to ridge portions of the fingerprint from the first fingerprint data, for generating representative data based on the plurality of maxima of the second fingerprint data, and for converting the representative data to luminance data of each of the pixel units, wherein the fingerprint sensing unit includes a light converter for converting the reflected light into the converted light having one or more wavelengths within a predefined wavelength range, and wherein the light converter overlaps an organic light emitting layer of the plurality of pixel units in a lateral direction;
a timing control unit for calculating a degree of deterioration of the fingerprint recognition unit to generate compensation data using the luminance data of each of the pixel units;
a plurality of data lines; and
a data driving unit electrically connected to the plurality of pixel units through the plurality of data lines,
wherein the fingerprint recognition unit is configured to receive a plurality of data signals generated based on the compensation data from the data driving unit.

11. The display device of claim 10,
wherein the first fingerprint data includes a plurality of digital values associated with a preset region in the fingerprint, and
the fingerprint sensing unit selects local maximum values among the digital values as the maxima to generate the second fingerprint data.

12. The display device of claim 10,
wherein the fingerprint sensing unit includes a light sensor for detecting an amount of the converted light.

13. The display device of claim 10, wherein the representative data is an average value or greatest value of the maxima included in the second fingerprint data.

14. The display device of claim 10, wherein the timing control unit calculates the degree of deterioration of the fingerprint recognition unit to generate the compensation data by dividing a previously stored initial luminance value of each of the pixel units by the luminance data of each of the pixel units.

15. A method of operating a display device, the display device comprising a fingerprint recognition unit and a plurality of pixel units, the method comprising:
emitting first light from the plurality of pixel units to a user's finger;
converting, using a light converter of the display device, reflected light of the first light into converted light having one or more wavelengths within a predefined wavelength range, wherein the light converter overlaps an organic light emitting layer of the plurality of pixel units in a lateral direction;
recognizing, using the fingerprint recognition unit and the converted light, a fingerprint to generate first fingerprint data;
generating second fingerprint data including a plurality of maxima corresponding to ridge portions of the fingerprint from the first fingerprint data to generate second fingerprint data;
generating representative data based on the plurality of maxima of the second fingerprint data;
converting the representative data to luminance data of each of the pixel units;
generating compensation data using the luminance data of each of the pixel units; and
generating a data signal based on the compensation data.

16. The method of claim 15, further comprising:
providing the data signal to the fingerprint recognition unit.

17. The method of claim 15,
wherein the recognizing the fingerprint includes:
measuring an amount of the converted light.

18. The method of claim 15,
wherein the representative data is an average value or greatest value of the maxima included in the second fingerprint data.

19. The method of claim 15, wherein generation of the compensation data includes dividing a previously stored initial luminance value of each of the pixel units by the luminance data of each of the pixel units.

* * * * *